(12) United States Patent
Lee et al.

(10) Patent No.: US 11,910,400 B2
(45) Date of Patent: Feb. 20, 2024

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/988,689

(22) Filed: Nov. 16, 2022

(65) Prior Publication Data

US 2023/0101294 A1 Mar. 30, 2023

Related U.S. Application Data

(63) Continuation of application No. PCT/KR2022/000903, filed on Jan. 18, 2022.

(60) Provisional application No. 63/138,722, filed on Jan. 18, 2021.

(51) Int. Cl.
*H04W 72/23* (2023.01)
*H04W 76/27* (2018.01)

(52) U.S. Cl.
CPC .......... *H04W 72/23* (2023.01); *H04W 76/27* (2018.02)

(58) Field of Classification Search
None
See application file for complete search history.

(56) References Cited

U.S. PATENT DOCUMENTS

| | | | |
|---|---|---|---|
| 2020/0107268 A1 | 4/2020 | Lee et al. | |
| 2020/0196349 A1 | 6/2020 | He et al. | |
| 2021/0259040 A1* | 8/2021 | Babaei ................ | H04W 76/27 |
| 2021/0274525 A1* | 9/2021 | Wei ........................ | H04W 72/23 |
| 2021/0307055 A1* | 9/2021 | Tsai ...................... | H04W 76/30 |
| 2021/0315049 A1* | 10/2021 | Wei ........................ | H04W 76/27 |
| 2021/0337625 A1* | 10/2021 | Tsai .................... | H04W 74/0833 |
| 2021/0410180 A1* | 12/2021 | Tsai .................... | H04W 72/1263 |
| 2022/0210798 A1* | 6/2022 | Tsai ...................... | H04L 5/0053 |
| 2022/0210860 A1* | 6/2022 | Chin ...................... | H04W 72/23 |
| 2022/0225257 A1* | 7/2022 | Laselva ................ | H04W 24/10 |

(Continued)

FOREIGN PATENT DOCUMENTS

WO 2020032659 A1 2/2020

OTHER PUBLICATIONS

R2-2100145: Samsung, "Configured Grant based Small Data Transmission," 3GPP TSG RAN2 Meeting #113 Electronic, Jan. 25-Feb. 5, 2021 (6 Pages).

(Continued)

*Primary Examiner* — Clemence S Han
(74) *Attorney, Agent, or Firm* — BRYAN CAVE LEIGHTON PAISNER LLP

(57) ABSTRACT

User equipment according to an embodiment of the present disclosure may: receive a radio resource control (RRC) release message including small data transmission (SDT) configuration information related to a configured grant (CG); switch to an RRC INACTIVE state; and, on the basis of a case in which a resource for the CG is activated on the basis of the SDT configuration information, transmit SDT data via the resource.

12 Claims, 16 Drawing Sheets

(56) References Cited

U.S. PATENT DOCUMENTS

2022/0330374 A1* 10/2022 Kim .................. H04W 76/27
2023/0030443 A1* 2/2023 Chen ............... H04W 74/0833

OTHER PUBLICATIONS

R2-2100297: CATT, "Analysis on CG-based SDT," 3GPP TSG-RAN WG2 Meeting #113 electronic Online, Jan 25-Feb 5, 2021 (6 Pages)

R2-2101231: Qualcomm Incorporated, "Discussion on RACH based NR small data transmission," 3GPP TSG-RAN WG2 Meeting #113e Online, Jan. 25-Feb. 5, 2020 (7 Pages).

R2-2100930: Email discussion rapporteur (Lenovo,) "Report from email discussion [Post112-e][550][SDT] Further details of CG aspects," 3GPP RAN WG2 Meeting #113e E-Meeting, Jan. 25-Feb. 5, 2021, (31 Pages).

* cited by examiner

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a Continuation Application of International Application No. PCT/KR2022/000903, filed on Jan. 18, 2022, which claims the benefit of and priority to U.S. Provisional Application No. 63/138,722, filed on Jan. 18, 2021, the contents of which are all hereby incorporated by reference herein in their entirety

TECHNICAL FIELD

The present disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of transmitting a signal by a user equipment (UE) in a wireless communication system includes receiving a radio resource control (RRC) release message including small data transmission (SDT) configuration information related to a configured grant (CG), converting a current state to an RRC INACTIVE state, and based on that a resource for the CG is activated based on the SDT configuration information, transmitting SDT data through the resource.

The RRC release message may include at least one of a search space for one or more SDTs, a CG configuration for the SDT, a UE-specific radio network temporary identifier (RNTI) for the SDT, a maximum number of HARQ processes for a CG for the SDT, a cell index for the SDT, or a UL/DL bandwidth part (BWP) configuration for the SDT.

The CG configuration for the SDT may include one or more CG configuration indexes.

The resource for transmitting the SDT data may correspond to a CG configuration index mapped to the SDT data.

The method may further include monitoring the search space for the one or more SDTs, receiving downlink control information (DCI), and retransmitting the SDT data based on the DCI.

The DCI may include at least one of resource allocation information for transmission of the SDT data or indication information indicating deactivation, release, or suspension of the CG.

Based on that at least one of predefined conditions is satisfied, the SDT data may be transmitted after an RACH is triggered, and the predefined conditions may include at least one of a case in which a CG resource for the CG is not allocated, a case in which the CG is released or deactivated, a case in which quality of a synchronization signal block (SSB) mapped to the activated CG resource is equal to or less than a threshold, a case in which quality of a serving cell is equal to or less than a threshold, or a case in which data is generated in a SDT logical channel that is not mapped to the CG.

The method may further include, based on that at least one of the predefined conditions is satisfied, transmitting a random access preamble for a SDT related to the CG, receiving a UL grant, and when the DCI includes CG activation indication for a SDT CG configuration index, determining a resource for the CG to be activated.

When the DCI does not include CG activation indication for the SDT CG configuration index, it may be determined that the CG is not activated.

The search space for the one or more SDTs may be a common search space (CSS) or a UE-specific search space (USS).

Another aspect of the present disclosure may provide a processor-readable recording medium for recording instructions for performing the method.

Another aspect of the present disclosure may provide a UE for performing the method of transmitting a signal.

Another aspect of the present disclosure may provide a device for controlling a UE for performing the method of transmitting a signal.

According to an aspect of the present disclosure, a method of receiving a signal by a base station (BS) in a wireless communication system includes transmitting a radio resource control (RRC) release message including small data transmission (SDT) configuration information related to a configured grant (CG), and based on that a resource for the CG is activated based on the SDT configuration information, receiving SDT data through the resource, wherein the RRC release message includes at least one of a search space for one or more SDTs, a CG configuration for the SDT, a UE-specific radio network temporary identifier (RNTI) for the SDT, a maximum number of HARQ processes for a CG for the SDT, a cell index for the SDT, or a UL/DL bandwidth part (BWP) configuration for the SDT.

Another aspect of the present disclosure may provide a base station (BS) for performing the method.

According to the present disclosure, wireless signal transmission and reception may be effectively performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
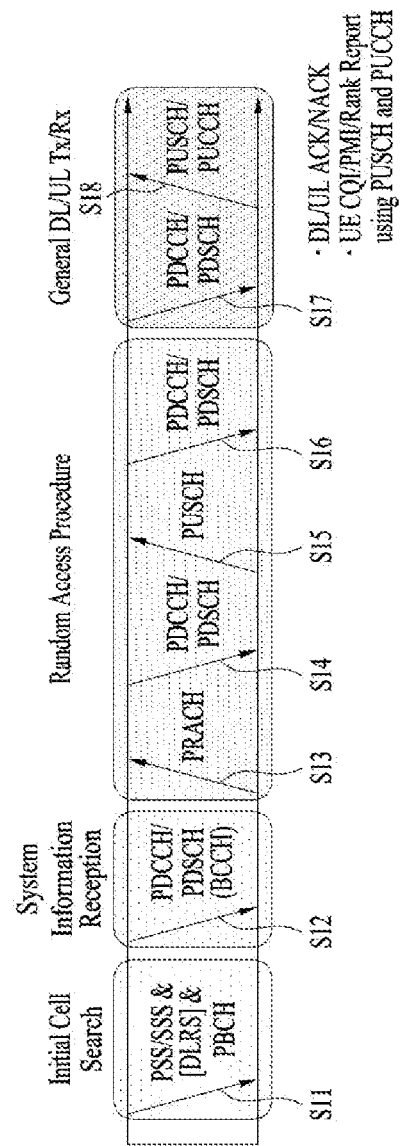
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
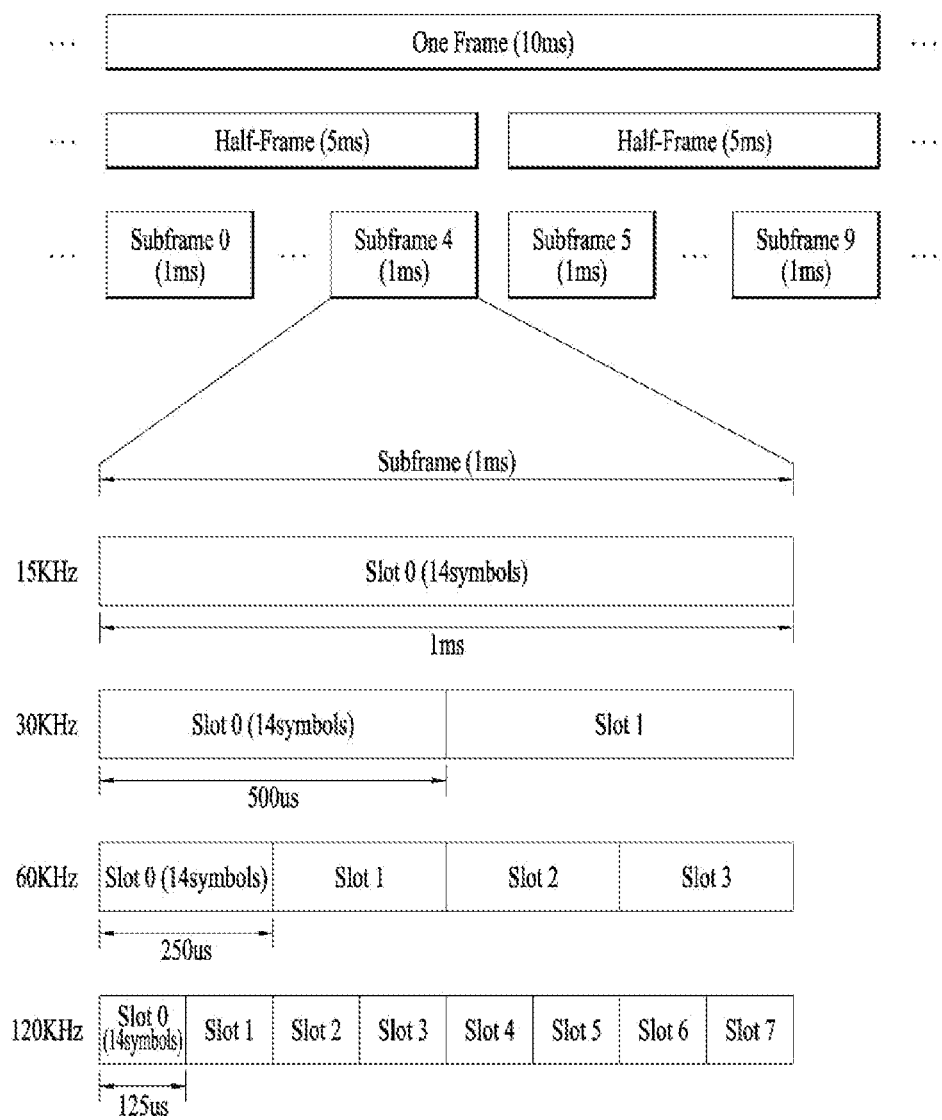
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame, u}$: Number of slots in a frame
* $N_{slot}^{subframe, u}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

The structure of the frame is merely an example. The number of subframes, the number of slots, and the number of symbols in a frame may vary. In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
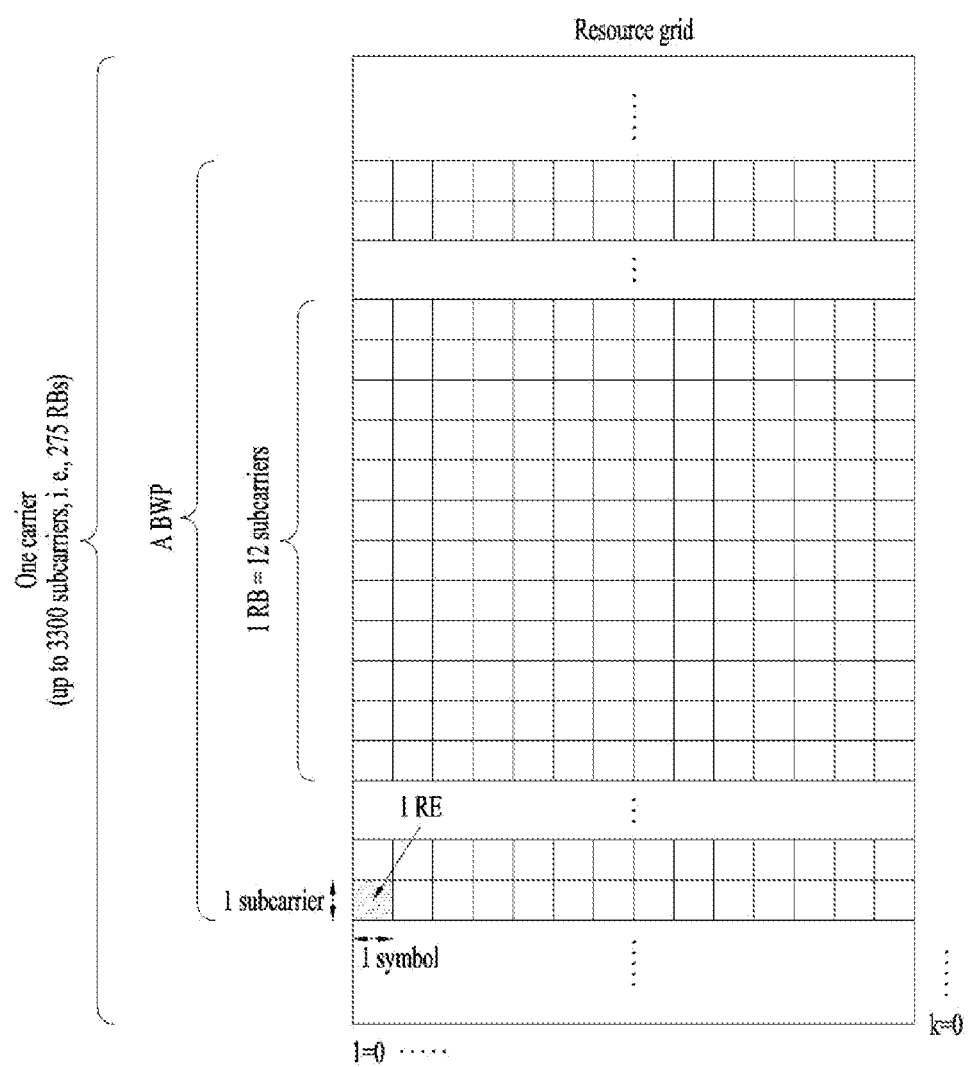
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain A resource block (RB) is defined as a plurality of consecutive subcarriers (e.g., 12 consecutive subcarriers) in the frequency domain A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Bandwidth Part, BWP

In the NR system, up to 400 MHz per carrier may be supported. When a UE operating in such a wideband carrier always operates with a radio frequency (RF) module for the entire carrier turned on, battery consumption of the UE may increase. Alternatively, considering various use cases (e.g., eMBB, URLLC, mMTC, and so on) operating within a single wideband carrier, a different numerology (e.g., SCS) may be supported for each frequency band within the carrier. Alternatively, each UE may have a different maximum bandwidth capability. In this regard, the BS may indicate to the UE to operate only in a partial bandwidth instead of the total bandwidth of the wideband carrier. The partial bandwidth may be defined as a BWP. A BWP is a subset of contiguous common RBs defined for numerology ui in BWP i on the carrier, and one numerology (e.g., SCS, CP length, or slot or mini-slot duration) may be configured for the BWP.

The BS may configure one or more BWPs in one carrier configured for the UE. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells. That is, the BS may configure at least one DL/UL BWP for a UE associated with the wideband carrier, activate at least one of DL/UL BWP(s) configured at a specific time point (by L1 signaling being a physical-layer control signal, a MAC control element (CE) being a MAC-layer control signal, or RRC signaling), or set a timer value and switch the UE to a predetermined DL/UL BWP, upon expiration of the timer. To indicate switching to another configured DL/UL BWP, DCI format 1_1 or DCI format 0_1 may be used. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

Figure 4:
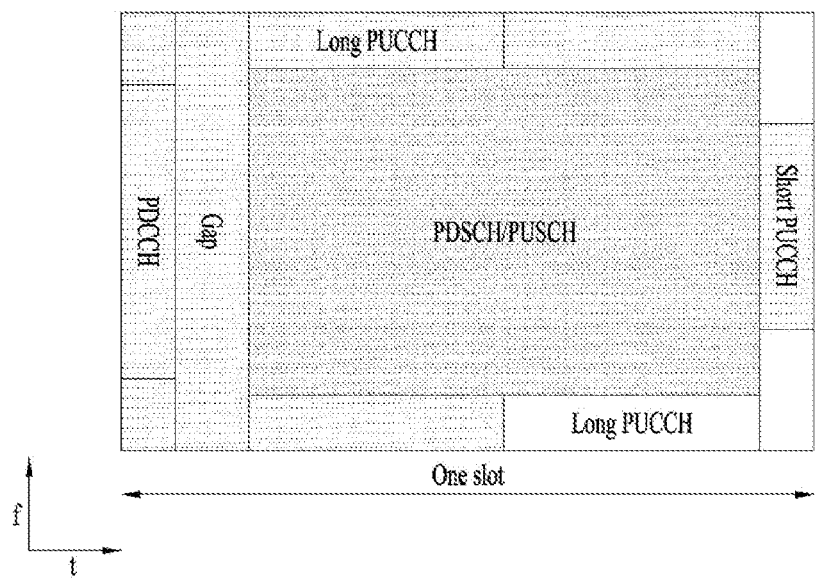
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 0_2 | Scheduling of PUSCH in one cell |
| 1_0 | Scheduling of PDSCH in one cell |
| 1_1 | Scheduling of PDSCH in one cell |
| 1_2 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs. DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

- SR(Scheduling Request): Information used to request UL-SCH resources.
- HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
- CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

SSB (Synchronization Signal Block) Transmission and Related Operations

Figure 5:
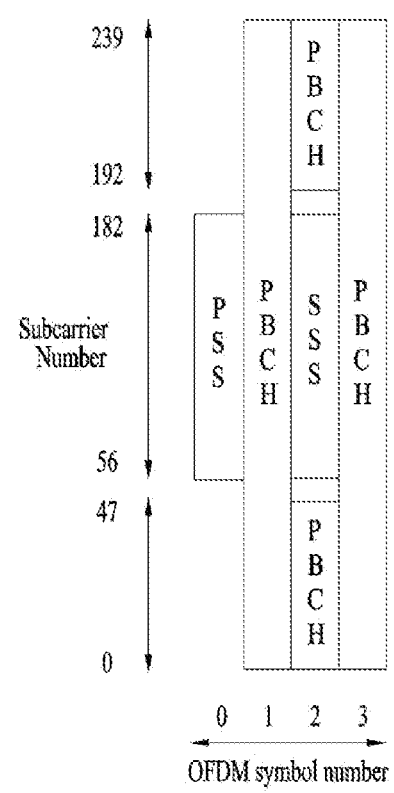
FIG. 5 is a diagram illustrating a signal flow for a physical downlink control channel (PDCCH) transmission and reception process.

FIG. 5 is a diagram illustrating a synchronization signal block (SSB) structure. A UE may perform cell search, system information acquisition, beam alignment for initial access, DL measurement, and so on based on an SSB. The term SSB is interchangeably used with SS/PBCH block.

Referring to FIG. 5, an SSB includes a PSS, an SSS, and a PBCH. The SSB includes four consecutive OFDM symbols, which carry the PSS, PBCH, SSS/PBCH, and PBCH, respectively. Each of the PSS and the SSS includes one OFDM symbol by 127 subcarriers, and the PBCH includes three OFDM symbols by 576 subcarriers. Polar coding and quadrature phase shift keying (QPSK) are applied to the PBCH. The PBCH includes data REs and DMRS REs in each OFDM symbol. There are three DMRS REs per RB, with three data REs between every two adjacent DMRS REs.

Cell Search

Cell search is a process of acquiring time/frequency synchronization with a cell and detecting the cell ID (e.g., physical layer cell ID (PCID)) of the cell at a UE. The PSS is used to detect a cell ID in a cell ID group, and the SSS is used to detect the cell ID group. The PBCH is used to detect an SSB (time) index and a half-frame.

The cell search procedure of the UE may be summarized in Table 6 below.

TABLE 6

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There are 336 cell ID groups, and there are 3 cell IDs for each cell ID group. There are a total of 1008 cell IDs. Information on the cell ID group to which the cell ID of the cell belongs is provided/obtained through the SSS of the cell, and information on the cell ID among 336 cells in the cell ID is provided/obtained through the PSS.

System Information Acquisition

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to acquire the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Random Access Procedure

Figure 6A:
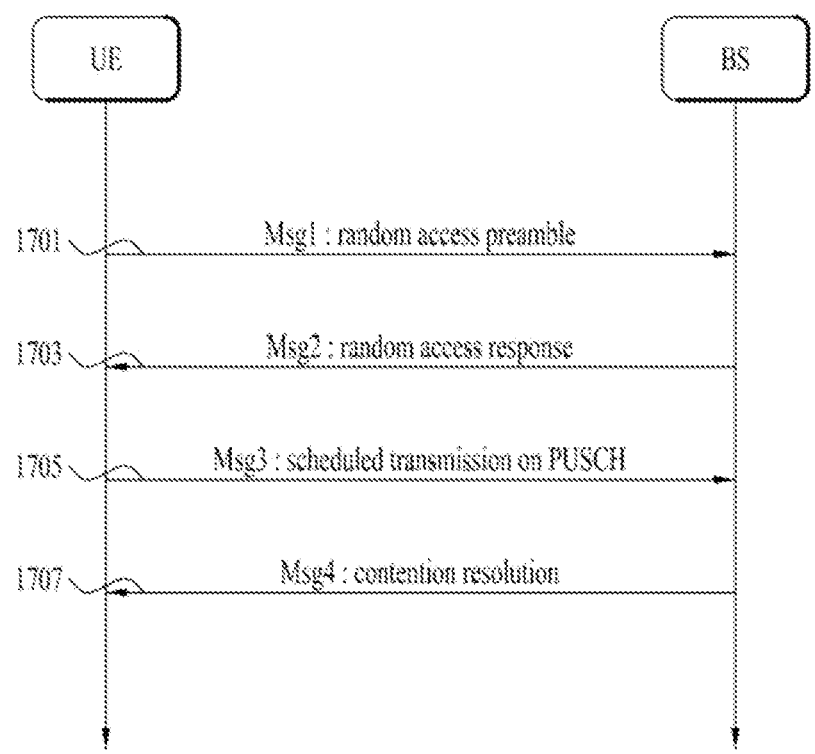
FIGS. 6A and 6B illustrate exemplary multi-beam transmission of an SSB.

The random access procedure of the UE can be summarized as shown in Table 7 and FIG. 6A.

TABLE 7

| | Type of Signals | Operations/Information obtained |
|---|---|---|
| $1^{st}$ step | PRACH preamble in UL | Initial beam obtainment Random selection of RA-preamble ID |
| $2^{nd}$ step | Random Access Response on DL-SCH | Timing Advanced information RA-preamble ID Initial UL grant, Temporary C-RNTI |
| $3^{rd}$ step | UL transmission on UL-SCH | RRC connection request UE identifier |
| $4^{th}$ step | Contention Resolution on DL | Temporary C-RNTI on PDCCH for initial access C-RNTI on PDCCH for UE in RRC_CONNECTED |

The random access process is used for a variety of purposes. For example, the random access procedure may be used for network initial access, handover, and UE-triggered UL data transmission. The UE may acquire UL synchronization and UL transmission resources through a random access procedure. The random access process is divided into a contention-based random access process and a contention free random access process.

Figure 6B:
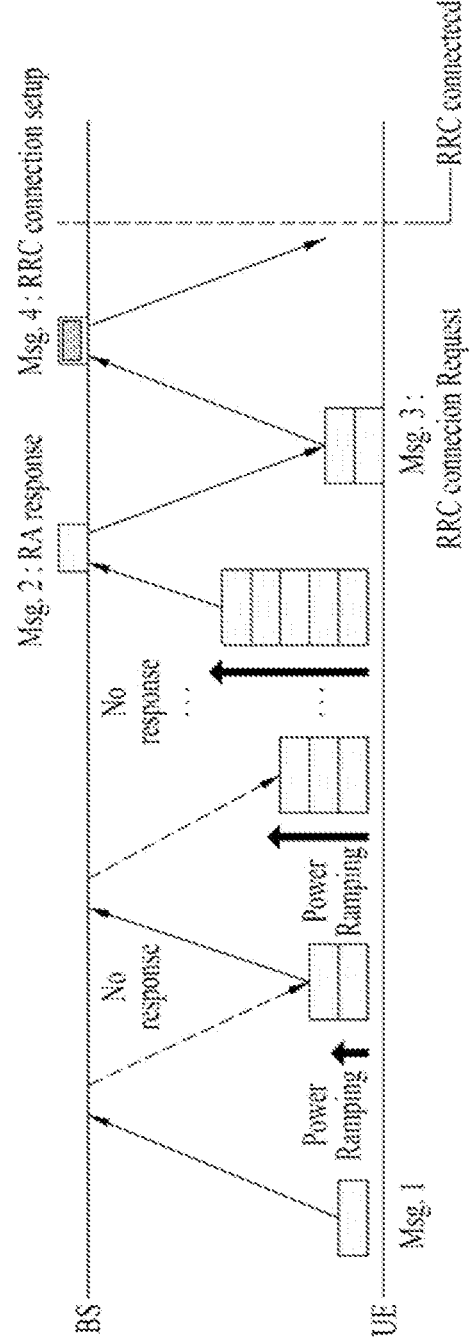

FIGS. 6A and 6B show an example of a random access process, in particular a contention-based random access process.

First, the UE may transmit the random access preamble as Msg1 of the random access procedure in the UL through the PRACH (eg, refer to 1701 of FIG. 6A).

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives an RAR from the BS, the RACH procedure is completed.

As described before, the UL grant included in the RAR schedules a PUSCH transmission for the UE. A PUSCH carrying an initial UL transmission based on the UL grant of the RAR is referred to as an Msg 3 PUSCH. The contents of the RAR UL grant start from the MSB and ends in the LSB, given as Table 8.

TABLE 8

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The transmit power control (TPC) command is used to determine the transmission power of the Msg 3 PUSCH. For example, the TPC command is interpreted according to Table 9.

TABLE 9

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE includes the aperiodic CSI report in the corresponding PUSCH transmission. The subcarrier interval for Msg3 PUSCH transmission is provided by the RRC parameter. The UE will transmit the PRACH and the Msg3 PUSCH on the same uplink carrier of the same serving cell. UL BWP for Msg3 PUSCH transmission is indicated by SIB1 (SystemInformationBlock1).

Figure 7A:
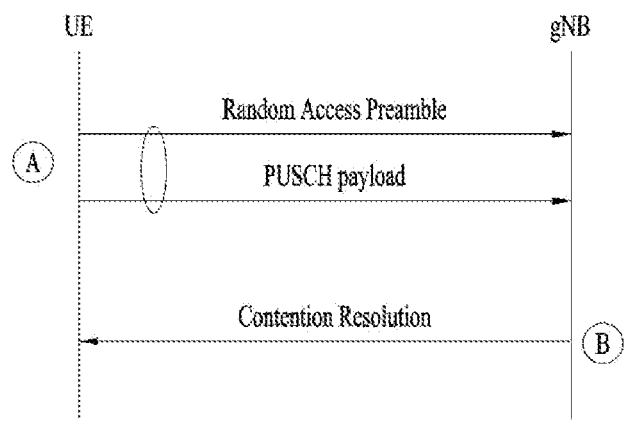
FIGS. 7A and 7B show an example of a two-step RACH procedure.
Figure 7B:
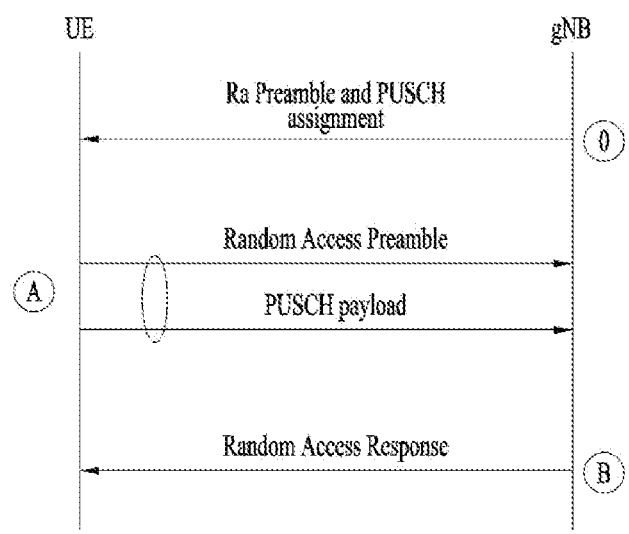

FIG. 7 is a diagram for explaining a 2-step RACH procedure. Specifically, in FIG. 7, FIG. 7A shows contention-based random access (CBRA), and FIG. 7B shows contention-free random access (CFRA).

In FIG. 7, message A (MSGA) includes a preamble and a payload (PUSCH payload). The preamble and the payload are multiplexed in the TDM method. Message B (MSGB) may be transmitted for contention resolution, fallback indication(s) and/or backoff indication as a response to message A.

Configured Grant (CG)

The UE may be configured with a semi-static configured grant (CG) through RRC. For the BWP of a serving cell, the UE may be configured with up to 12 active CGs.

Each CG may have Type 1 or Type 2. Activation/deactivation of a Type-1 CG may be performed independently between serving cells. When a plurality of Type-2 CGs are configured, activation of each Type-2 CG may be separately performed by DCI. One DCI may inactivate one Type-2 CG or inactivate a plurality of Type-2 CGs.

For CG-based transmission on NR-U (i.e., shared spectrum channel access), configured grant uplink control information (CG-UCI) may be transmitted on a corresponding CG PUSCH (i.e., PUSCH scheduled by a CG). Multiplexing between CG-UCI and a PUCCH carrying a HARQ-ACK on NR-U may be configured/allowed by the BS. As a case where no multiplexing is configured between the CG-UCI and the PUCCH carrying the HARQ-ACK, the PUCCH carrying the HARQ-ACK may overlap with the CG PUSCH in a PUCCH group. In this case, transmission of the CG PUSCH may be dropped.

The NR may support the RRC_INACTIVE state in addition to the RRC_IDLE state, and a terminal that transmits infrequent (periodic and/or non-periodic) data may be generally instructed to stay in the RRC_INACTIVE state by the BS. Since even the Rel-16 does not support data transmission in the RRC_INACTIVE state, the UE needs to resume RRC connection, that is, transition to the RRC_CONNECTED state in order to transmit UL (Mobile Originated) and/or DL (Mobile Terminated) data. Connection setup for data transmission and a subsequent process of returning to the RRC_INACTIVE state may be required regardless of the size of data to be transmitted, and thus may cause unnecessary power consumption and signaling overhead. This problem may become particularly serious when the size of data to be transmitted is small and transmission is infrequent as follows.

1. Smartphone Applications:
Traffic from Instant Messaging (IM) services
Heart-beat/keep-alive traffic from IM/e-mail clients and other apps
Push notifications from various applications
2. Non-Smartphone Applications:
Traffic from wearables (periodic positioning information, etc.)
Sensors (Industrial Wireless Sensor Networks transmitting temperature, pressure readings periodically or in an event triggered manner, etc.)

Smart meters and smart meter networks sending periodic meter readings

The UE may transmit SDT UL data through a Configured Grant (CG) However, there is a problem in that it is not clear under which conditions the UE is capable of performing SDT transmission through the CG. Accordingly, SDT transmission through the CG may frequently fail.

RACH and CG-SDT Method

In order to address the aforementioned issues, an NR UE may start SDT after RACH in the RRC_INACTIVE state.

Figure 8:
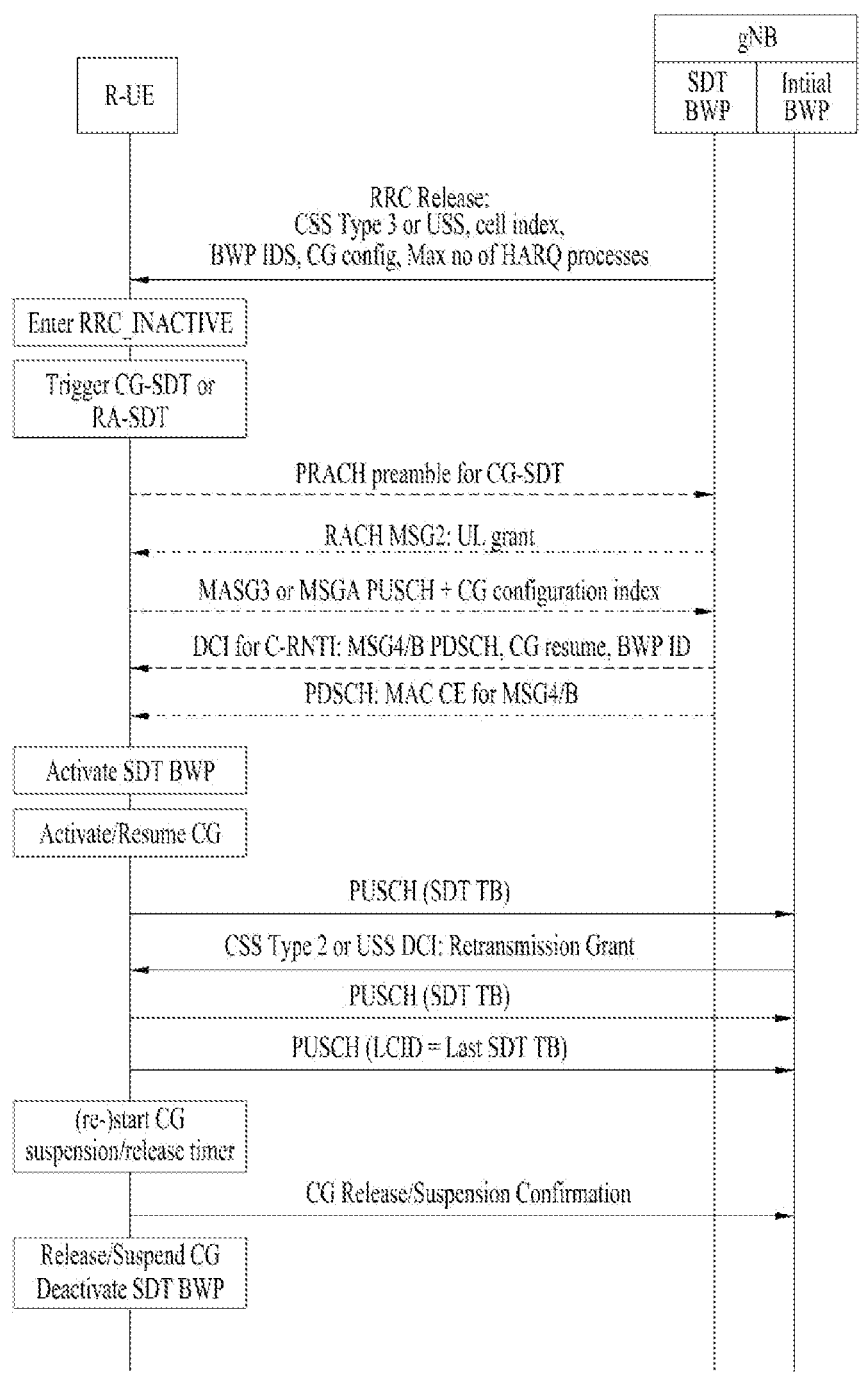
FIG. 8 illustrates an example of a RACH and SDT transmission process according to the present disclosure.

FIG. 8 illustrates an example of a RACH and SDT transmission process according to the present disclosure. Referring to FIG. 8, a BS (gNB) and a UE configure SDT and transmit UL data through the SDT as follows.

1. An RRC_CONNECTED UE receives an RRC Release message indicating suspension and switches to RRC_INACTIVE. In this case, a UE dedicated message may include one or more of SDT configuration information as described below. The UE dedicated message is the RRC Reconfiguration message received by the UE before the RRC Release message, or the RRC Release message.

A. One or More SDT Search Spaces i. The BS may provide one or more search space configurations for SDT. For example, CSS Type 3 that may be used in the inactive state or one or more USSs may be allocated. When there is no SDT search space configuration received by the UE through the UE dedicated message, the UE receives and stores a CSS type SDT search space configuration from the system information of the serving cell in the RRC_INACTIVE state.

ii. When the UE performs SDT RACH in the inactive state, the BS may reconfigure the SDT search space configuration dedicated to the UE.

B. Configured Grant (CG) Configuration for SDT i. The BS may configure the CG for SDT through an RRC release message. For example, one or a plurality of CG configuration index values may be allocated, and CG Type 1 resources may be configured for each CG configuration index as shown in Table 10. In CG Type 1, the CG may be immediately activated when the UE receives the RRC Release message. The BS may also configure CG Type 2 through the RRC Release message. In this case, when the Activation DCI is received, the CG may be activated.

TABLE 10

```
rrc-ConfiguredUplinkGrant        SEQUENCE {
    timeDomainOffset             INTEGER (0..5119),
    timeDomainAllocation         INTEGER (0..15),
    frequencyDomainAllocation                BIT STRING (SIZE(18)),
    antennaPort           INTEGER (0..31),
    dmrs-SeqInitialization       INTEGER (0..1)
    precodingAndNumberOfLayers                        INTEGER (0..63),
    srs-ResourceIndicator        INTEGER (0..15)
    mcsAndTBS                    INTEGER (0..31),
    frequencyHoppingOffset       INTEGER (1.. maxNrofPhysicalResourceBlocks-1)
    pathlossReferenceIndex       INTEGER (0..maxNrofPUSCH-
PathlossReferenceRSs-1),
    ...,
    [[
    pusch-RepTypeIndicator-r16            ENUMERATED {pusch-RepTypeA,pusch-
RepTypeB}
    frequencyHoppingPUSCH-RepTypeB-r16 ENUMERATED {interRepetition,
interSlot}
    timeReferenceSFN-r16         ENUMERATED {sfn512}
    ]]
}
``` ii. The SDT CG resource may map a Reference Signal (RS) to each CG configuration index or to one or a plurality of HARQ Process IDs of one CG configuration index. That is, when a plurality of CG configurations are supported, different CG resources mapped to different CG configuration indexes may be mapped to different RSs. Alternatively, different CG resources mapped to different HARQ Process IDs of one CG configuration index may be mapped to different RSs.

For example, IE rrc-ConfiguredUplinkGrant for CG configuration index=1 may include srs-ResourceIndicator, and srs-ResourceIndicator may be mapped to resourceId of Table 11. Thus, all resources for CG configuration index=1 may be mapped to ssb-index or csi-RS-Index of SRS-SpatialRelationInfo. A CG configuration index may be mapped to a specific RS using this method. Alternatively, the CG configuration index may include ssb-Index or csi-RS-Index mapped within IE rrc-ConfiguredUplinkGrant.

TABLE 11

```
SRS-SpatialRelationInfo ::=    SEQUENCE {
    servingCellId          ServCellIndex
    referenceSignal        CHOICE {
        ssb-Index              SSB-Index,
        csi-RS-Index           NZP-CSI-RS -ResourceId,
        srs                    SEQUENCE {
            resourceId             SRS-ResourceId,
            uplinkBWP              BWP-Id
        }
    }
}
```

Different CG resources mapped to different HARQ Process IDs of one CG configuration index may be mapped to different RSs. For example, CG resources mapped to HARQ Process ID=1 may be configured to be mapped to ssb-index=1 and 2, and CG resources mapped to HARQ process ID=2 may be configured to be mapped to ssb-index=3 and 4. Alternatively, HARQ Process IDs=1 and 3 may be mapped to SSB index=1, and HARQ Process IDs 2 and 4 may be mapped to SSB index=2. Such HARQ process ID to SSB index may be configured through an RRC Release message or a system path.

iii. The BS may configure a mapping relationship between the SDT CG configuration index and an SDT logical channel In this case, the UE may allow specific logical channel data to be transmitted only through a CG resource of the mapped SDT CG configuration index.

C. UE Specific RNTI for SDT i. The BS instructs the UE to continue to use the C-RNTI used in RRC_CONNECTED in RRC_INACTIVE, or allocates a new UE specific RNTI (e.g., a C-RNTI having a different value). When the UE performs SDT RACH in the inactive state, the BS may reconfigure the UE specific RNTI.

ii. When the BS instructs the UE to use the C-RNTI in the inactive state, the UE applies the C-RNTI to the SDT. In this operation, the UE applies the C-RNTI only to the cell index indicated by the BS. If the UE leaves the cell of the cell index and reselects another cell in the inactive state, the UE discards the corresponding C-RNTI.

D. Number of HARQ Processes for SDT CG i. The BS may configure the number of HARQ processes for SDT CG through a UE-only message or system information. The UE may map a CG resource to a HARQ process ID according to the number of HARQ processes. The CG resource may be periodically allocated. Thus, for example, when N HARQ process IDs are configured, one HARQ process ID may be allocated for each CG resource period, a next HARQ process ID may be allocated in a next cycle. As such, for each CG resource cycle, one of N HARQ process IDs may be allocated to be repeated once for each N-th CG resource cycle.

ii. Alternatively, the UE may report the maximum number of HARQ processes to the BS with capability, and the BS may operate the HARQ process for SDT CG transmission as much as the reported number.

E. Cell Index for SDT i. The BS may provide a separate SDT BWP ID through a UE dedicated message or system information.

ii. The UE applies the SDT configuration information only to the cell indicated by the cell index, and performs the SDT only in the indicated cell.

F. UL/DL BWP configuration for SDT i. The BS may provide separate one or a plurality of SDT BWP IDs through a UE-only message or system information. In addition, the BS may provide a detailed configuration such as PRB, SCS, or the like for each SDT BWP.

ii. The SDT BWP ID may be applied to the cell index. Thus, the UE may apply the SDT configuration information to an SDT BWP ID of an indicated Cell index. That is, SDT may be performed only in a UL/DL BWP indicated by a BWP ID.

iii. When a separate SDT BWP ID is not configured using the UE-only message, the UE may receive system information to configure an SDT BWP ID in an inactive state. In this case, when a cell of the cell index indicates that the SDT is supported using system information and the system information does not configure a separate SDT BWP ID, the UE may perform the SDT through an initial BWP.

2. Upon receiving the RRC Release, the UE enters the RRC_INACTIVE mode and performs cell selection or cell reselection. Then, the UE preferentially selects a cell for which the SDT configuration information of the RRC Release is supported. For example, the priority of the frequency of the cell indicated by the cell index may be set to be the highest, and an offset may be added to the quality of the cell indicated by the cell index such that the cell may be preferentially selected. In this case, the value of the offset may be set by the BS through a UE dedicated message such as the RRC Release A. When a cell of a cell index in which the SDT configuration information of RRC Release is supported is selected, if the quality of the corresponding cell is equal to or greater than a threshold, a Time Alignment Timer (TAT) for SDT may be (re)started. In contrast, if a cell in which the SDT configuration information is not supported (e.g., a cell that is not indicated by the cell index) is selected, or if the quality of the cell of the cell index is equal to or less than the threshold, the TAT (Time Alignment Timer) for SDT may not be suspended or (re)started.

3. An inactive UE may trigger an RACH for SDT and then perform SDT CG transmission when one or more of the following conditions are satisfied.

A. When a Configured Grant (CG) for SDT is not allocated

B. When the Configured Grant (CG) for SDT is Released/deactivated/suspended

C. When the TAT expires, is not started, or does not want to run

D. When data is generated in an SDT logical channel that is not mapped to the SDT CG E. When the quality of a serving cell is equal to or less than a threshold indicated by the BS F. When a SSB measurement value mapped to the SDT CG is equal to or less than a threshold G. When a speed of the UE is faster than a predetermined level For example, even when the CG resource for SDT is received using an RRC Release message, if the quality of the SSB mapped to the (activated) CG resource is equal to or less than the threshold, the UE may trigger the RACH for SDT, or may select another (activated) CG resource. If the quality of the SSB mapped to another (activated) CG resource is equal to or greater than the threshold, SDT UL data may be transmitted using the corresponding CG resource. If the quality of the SSB mapped to another (activated) CG resource is equal to or less than the threshold, and there is no CG resource configured for the UE or other (activated) CG resource, the RACH may be triggered.

Alternatively, even if the quality of the SSB mapped to the (activated) CG resource is equal to or greater than the threshold, when the TAT expires, the UE may trigger the RACH.

As such, when the RACH is triggered, the UE may select one SDT BWP included in the SDT configuration information, activate the corresponding UL BWP, and transmit an RACH preamble.

When the SDT CG is Released/deactivated/suspended and SDT UL data is generated, the UE may trigger the RACH. For example, when the CG configuration index for SDT is mapped to a CG Type 1 resource, the UE may immediately activate a CG resource of the corresponding CG configuration index while receiving the RRC release message. As such, in the activated state, the UE may transmit SDT UL data at any time using the corresponding CG resource. However, when the TAT expires in a next inactive mode, the UE moves to a new cell leaving the serving cell indicated by the cell index, or the UE triggers the RACH (for SDT) according to the above-described condition, the UE may release, deactivate, or suspend the corresponding CG configuration. For example, generally, the CG Type 1 is not deactivated, and thus the UE may suspend the corresponding CG configuration. When the SDT CG is CG Type 2, CG Type 2 may be released/deactivated under the condition. A CG resource of the SDT CG configuration released/deactivated/suspended as such may not be temporarily used in transmission of SDT UL data. Thus, in this state, when SDT UL data is generated, the RACH may be triggered.

If a UE dedicated preamble for the SDT CG is included in the SDT RACH configuration, and the SSB or CSI-RS measurement result to which the corresponding preamble is mapped is equal to or greater than a threshold, the UE dedicated preamble may be transmitted from the RO included in the SDT RACH configuration to start the contention-free RACH. When the contention free RACH is triggered in this way, the UE may transmit the UE dedicated preamble, monitor the PDCCH with the SDT SS, and receive the MSG2 DCI in which the CRC is scrambled with the C-RNTI through the SDT SS. The C-RNTI may be a C-RNTI used by the UE in the connected mode or a C-RNTI received using an RRC Release message. The MSG2 DCI may allocate SDT PUSCH resources or indicate CG Type 2 activation or CG Type 1 resume for the SDT CG configuration index.

However, if the SSB or CSI-RS measurement result to which the UE dedicated preamble is mapped is equal to or less than the threshold, and the SDT CG dedicated preamble is included in the SDT RACH configuration, the Contention based RACH using the SDT CG dedicated preamble may be performed in the RO included in the SDT RACH configuration. In this case, if the SSB or CSI-RS measurement result to which the SDT CG dedicated preamble is mapped, the corresponding SDT dedicated preamble may be selected and the RACH preamble may be transmitted. Here, the SDT CG dedicated preamble may be a preamble to which one or a plurality of SDT CG configuration indexes is mapped or a preamble mapped to all SDT CGs.

If the SSB or CSI-RS measurement result to which the SDT CG dedicated preamble is mapped is not higher than the threshold, or if there is no SDT CG dedicated preamble in the SDT RACH configuration, the UE may select a general preamble and performs RACH. When transmitting the PRACH with the general preamble, the UE may triggers RRC connection establishment as in the prior art and transmit the RACH preamble for RRC connection establishment.

Alternatively, in the case of transmitting the PRACH with the general preamble, SDT CG may be performed according to an instruction of the BS. In this case, the CG configuration index received using the RRC Release message through MSG2 or MSG4 or MSGB of the RACH may be indicated.

When the configured Grant (CG) for SDT is allocated, the configured Grant (CG) for SDT is activated/resumed, TAT is running, data is generated from a SDT logical channel mapped to SDT CG, the UE may be stationary or at a low speed, and the quality of the serving cell or the SSB quality mapped to the SDT CG is equal to or greater than the threshold indicated by the BS, the SDT UL data may be transmitted through an SDT CG resource activated without RACH. Then, the SDT SS may be monitored to receive DCI for allocating a retransmission resource of the SDT CG or DCI indicating deactivation/release/suspension of the SDT CG.

4. In the case of 4-step RACH, the UE may monitor DCI in which CRC is scrambled with RA-RNTI or C-RNTI after transmitting the RACH preamble. In this case, the RA-RNTI of the RACH for SDT may be determined to be a value different from that of the conventional RA-RNTI. Alternatively, the MSG2 DCI may be monitored with an RNTI of a new value and name In this case, the MSG2 DCI may activate or resume SDT CG. For example, when the SDT CG configuration index is included in the MSG2 DCI, the UE may activate the corresponding SDT CG (CG Type 2) or resume (CG Type 1).

The UE may receive MSG2 PDSCH transmission through the received MSG2 DCI. In this case, the MAC PDU of the MSG2 PDSCH may include an RAPID for the RACH preamble transmitted by the UE in a sub-header. In addition, the MAC PDU of the MSG2 PDSCH may include RAR MAC CE mapped to sub=header. The RAR MAC CE may allocate the MSG3 PUSCH UL grant and Temporary C-RNTI for SDT UL data transmission, and a PUCCH resource. Alternatively, the RAR MAC CE may include a specific SDT CG configuration index to activate (CG Type 2) or resume (CG Type 1) the SDT CG. Alternatively, the RAR MAC CE may indicate transmission of the MSG3 UCI.

5. In the case of 4 step RACH without CG activation/resume, the UE may transmit a first TB (i.e., MAC PDU) through the MSG3 PUSCH. When the MSG2 DCI or the MSG2 RAR MAC CE indicates an SDT BWP ID, the UE may activate an indicated SDT BWP, and transmit the MSG3 in the activated SDT BWP. In this case, an initial BWP may be deactivated. However, there is no indicated SDT BWP, the MSG3 may be transmitted in the initial BWP.

In the case of 2 step RACH, the first TB may be transmitted through the MAGA PUSCH. If the SDT BWP ID is included in the SDT configuration information, the UE may activate the indicated SDT BWP and deactivate the MSGA in the SDT BWP. In this case, the UE may deactivate the initial BWP. However, there is no indicated SDT BWP, the UE may transmit the MSGA in the initial BWP.

In this case, the first TB may include a CCCHmessage including a UE ID and a SDT BSR MAC CE. In this case, the UE ID may be a C-RNTI used in an RRC_CONNECTED mode or a C-RNTI received using an RRC Releasemessage. An LCID field of a sub-header of the first TB may indicate {CCCH+SDT} or SDT. For example, a specific codepoint of the LCID may indicate {CCCH+SDT} or SDT. The SDT BSR MAC CE may indicate a data size in an L2 buffer of an SDT logical channel.

According to indication of SDT configuration information, MSG2 DCI, or RAR MAC CE of the BS, the UE may transmit UCI of a PUCCH resource, UCI of the MSG3 PUSCH, or UCI of the MSGA PUSCH. The UE may request CG activation or CG resume through UCI bits. In addition, a CG configuration index or an SDT logical channel ID suitable for SDT UL data may also be indicated through UCI bits. Alternatively, UCI bits may inform a traffic pattern of SDT UL data. For example, UCI bits=000 and 001 may indicate different UL data periods, data sizes, or QoS. Through this, the BS may select a CG configuration index in which SDT UL data of the UE matches a traffic pattern or logical channel. The CG configuration index, the SDT logical channel ID, the SDT UL data traffic pattern, the data period, the data size, QoS, etc. may be informed through the MSG3 MAC CE or MSG3 RRC message instead of the UCI.

6. After transmitting MSG3/A, the UE may receive HARQ retransmission resources or HARQ ACK or NACK of MSG3 or MSGA with DCI transmitted in DCI Format 0_0. In this case, CRC of DCI may be scrambled with Temporary C-RNTI.

In addition, after transmitting the MSG3/A, the UE may receive the Contention Resolution MAC CE or MSGB with DCI transmitted in DCI Format 1_0. A CRC of DCI for scheduling the Contention Resolution MAC CE may be scrambled with a Temporary C-RNTI of the MSG2 and a CRC of DCI for scheduling the MSGB may be scrambled with an MSGB-RNTI. Alternatively, the CRC of DCI for scheduling the Contention Resolution MAC CE may be scrambled with a C-RNTI used in the RRC_CONNECTED mode or may be scrambled with a C-RNTI received using RRC Releasemessage by the UE.

DCI for the DCI Format 0_0 or DCI Format 1_0 may additionally indicate CG activation or CG resume for the SDT CG configuration index. In this case, the UE may determine that the CG is activated or resumed after the RACH. If DCI does not additionally indicate CG activation or CG resume, when contention resolution is successful, the RACH process may be successfully terminated, the SDT BWP may be deactivated, and SDT UL transmission may be stopped. Then, the current BWP may be switched to the initial BWP to activate the initial BWP.

DCI Format 0_0 or DCI for the DCI Format 1_0 may additionally indicate an SDT BWP ID. For example, one of SDT BWP IDs in the SDT configuration information may be indicated. The UE receiving the corresponding DCI may activate the SDT BWP, and perform SDT CG UL transmission.

DCI Format 0_1 instead of the DCI Format 0_0 and DCI Format 1_1 instead of DCI Format 1_0 may be used, and a new DCI format for SDT may also be used.

7. When RACH contention resolution is achieved by receiving the CG activation or CG resume for a specific CG configuration index through the DCI and receiving MSG4 or MSGB, the UE may execute the CG activation or the CG resume for the indicated CG configuration index. Then, the UE may transmit SDT UL data according to a CG PUSCH resource that is periodically generated. The UE may transmit an SDT TB through an HARQ process of a HARQ Process ID mapped to the CG resource. In this case, the SDT TB may include data of a SDT logical channel mapped to the CG resource and zero or one or a plurality of MAC CEs.

8. In order to receive a retransmission resource of the CG resource, or for deactivation/release/suspension of the CG, the UE may monitor the SDT SS. The UE may receive a CG retransmission resource for a specific HARQ Process ID through the SDT SS. Alternatively, DCI indicating deactivation/release/suspension of the CG may be received through the SDT SS.

9. When a certain SDT TB includes the last SDT data, the UE may cause the SDT TB to indicate the last TB. For example, the codepoint of the LCID field included in the corresponding SDT TB may indicate to the last TB. Then, when DCI of SDT SS indicates HARQ ACK, SDT CG release/deactivation/suspension, or SDT BWP deactivation, the UE may release/deactivate/suspend SDT CG. Then, the SDT BWP may be deactivated, and the initial BWP may be activated.

10. In the above processes, the UE may start or restart a SDT timer in the first symbol immediately after the following case occurs:

When MSG2 indicating SDT is received,
When the MSG4/MSGB PDSCH is received,
When HARQ ACK for the MSG4/MSGB is transmitted,
When PUCCH transmission (for SDT SR) is performed,
When the SDT BWP is activated,
When CG PUSCH HARQ including UL data of a SDT logical channel is transmitted,
When CG PUSCH HARQ including the last SDT data is transmitted,
When HARQ ACK or NACK for transmission of CG PUSCH HARQ including data of the SDT logical channel is received.

When the SDT timer expires, the UE may release/deactivate/suspend the activated SDT CG. In this case, the UE may transmit a UCI or MAC CE indicating release/deactivation/suspension of the SDT CG to the BS. In this case, the UCI or the MAC CE may be configured with a CG configuration index of the corresponding SDT CG and bits indicating release/deactivation/suspension. Then, the UE may deactivate the SDT BWP, and activate the initial BWP.

Figure 9:
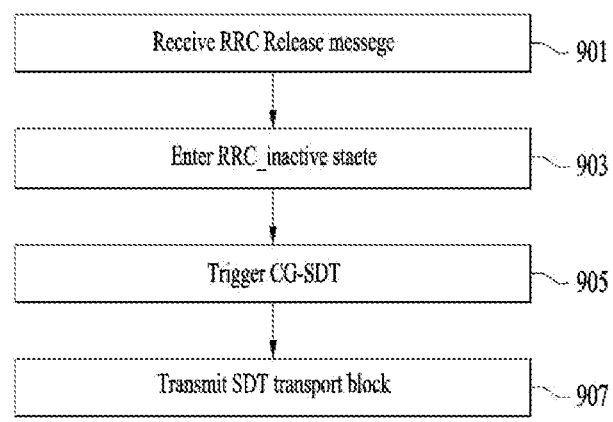
FIG. 9 is a diagram for explaining a method of transmitting and receiving a signal of a UE according to an embodiment of the present disclosure.

FIG. 9 is a diagram for explaining a method of transmitting and receiving a signal of a UE according to an embodiment of the present disclosure.

The UE may receive an RRC release message including SDT configuration information related to a CG (901).

The RRC release message may include at least one of a search space for one or more SDTs, a CG configuration for SDT, UE-specific radio network temporary identifier (RNTI) for SDT, the maximum number of HARQ processes for CG for SDT, a cell index for SDT, and a UL/DL bandwidth part (BWP) configuration for SDT.

The UE may convert the current state to the RRC INACTIVE state based on the RRC release message (903).

Based on that a resource for the CG is activated, the CG-SDT may be triggered, and SDT data may be transmitted through the corresponding resource (905 and 907).

The resource for transmitting the SDT data may correspond to a CG configuration index mapped to the SDT data. The CG configuration index may be included in the CG configuration for the SDT.

The UE may monitor the search spaces for the one or more SDTs to receive DCI, and retransmit the SDT data based on the DCI. Here, the DCI may include at least one of resource allocation information for retransmission of the SDT data, and indication information indicating deactivation, release, or suspension of the CG.

Alternatively, based on that at least one of predefined conditions is satisfied, the UE may also transmit SDT data after the RACH is triggered. The predefined conditions may include at least one of the case in which a CG resource for the CG is not allocated, the case in which the CG is released or deactivated, the case in which the quality of a synchronization signal block (SSB) mapped to the activated CG resource is equal to or less than a threshold, the case in which the quality of a serving cell is equal to or less than the threshold, and the case in which data is generated in an SDT logical channel that is not mapped to the CG.

In this case, the UE may transmit a random access preamble for the SDT related to the CG based on that at least one of predefined conditions is satisfied. The UE may receive a UL grant. When the DCI includes CG activation indication for the SDT CG configuration index, it may be determined that the resource related to the CG is activated.

Effects According to the Present Disclosure

According to the present disclosure, selection among a RACH for SDT, a normal RACH, and a CG for SDT may be clarified.

Figure 10:
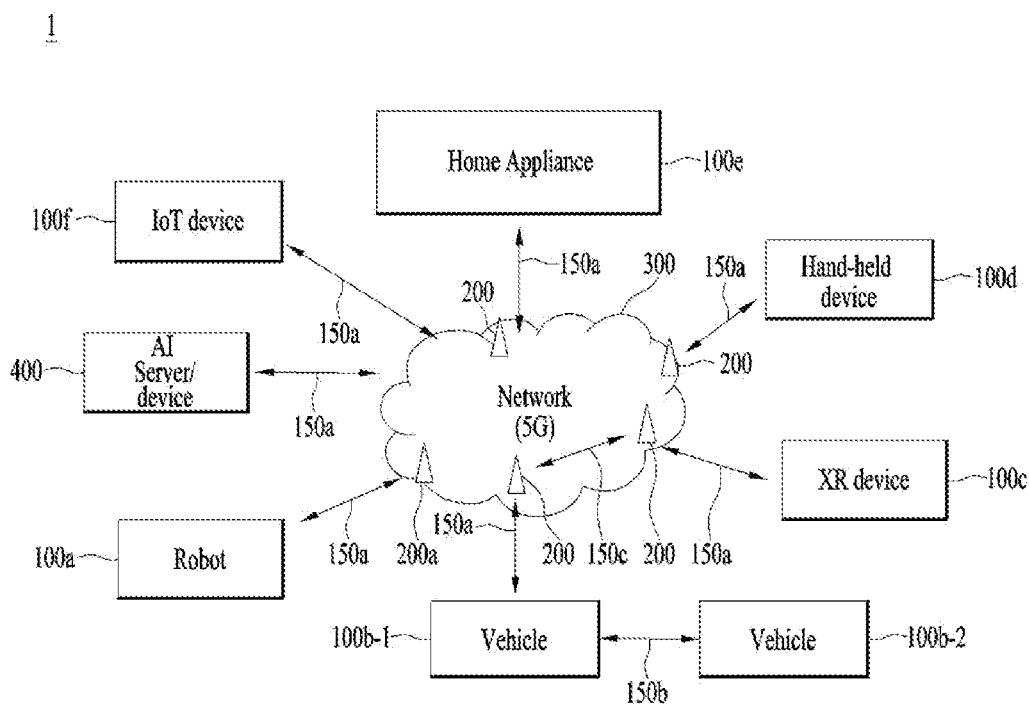
FIGS. 10 to 13 show a communication system and a wireless device applicable to the present disclosure.

FIG. 10 illustrates a communication system 1 applied to the present disclosure.

Referring to FIG. 10, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 11:
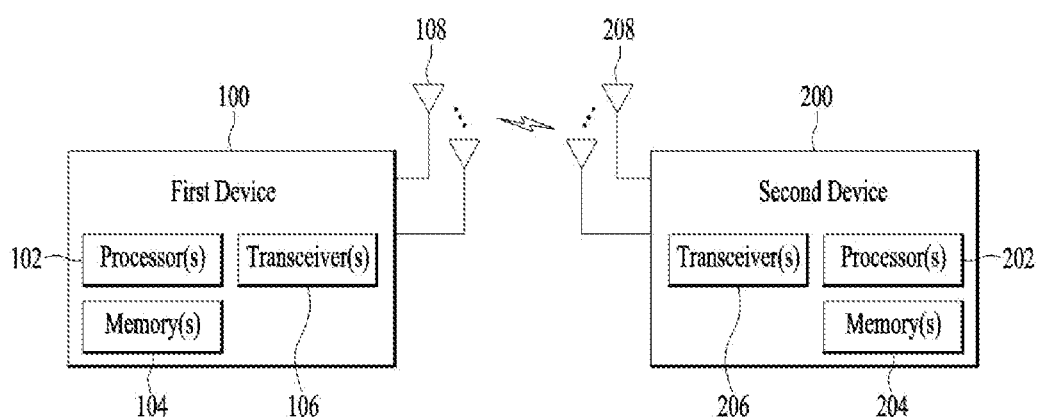

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 12:
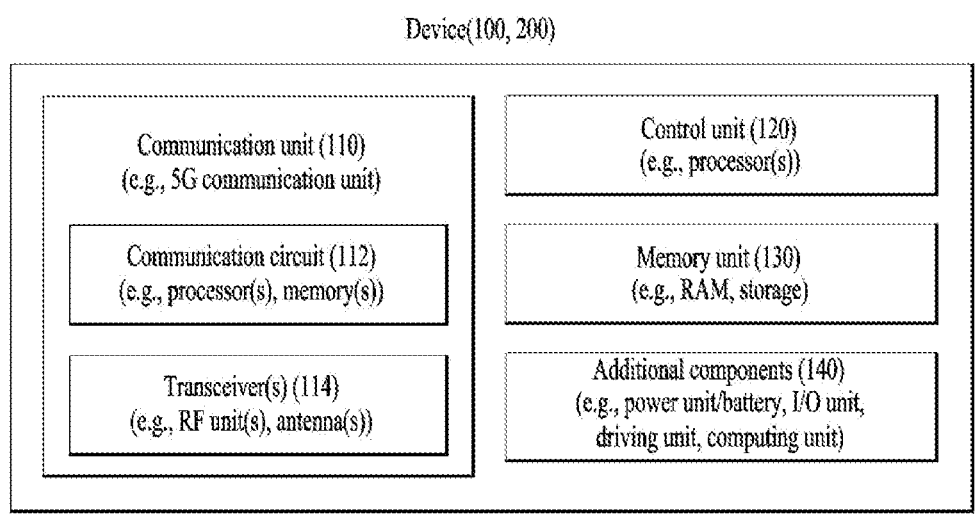

FIG. 12 illustrates another example of a wireless device applied to the present disclosure. The wireless device may be implemented in various forms according to a use-case/service (refer to FIG. 12).

Referring to FIG. 12, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 13:
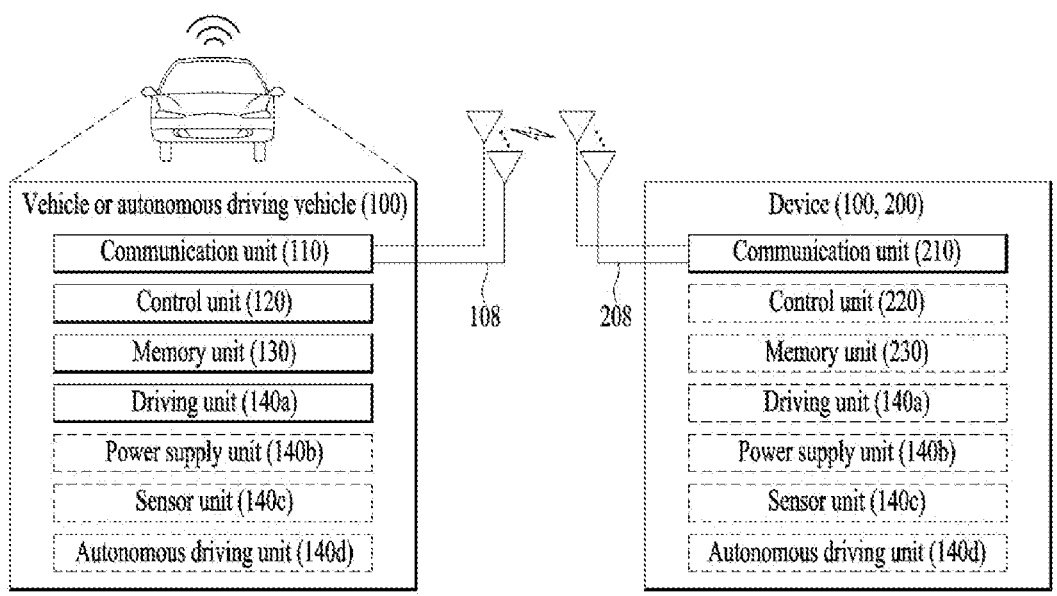

FIG. 13 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 14:
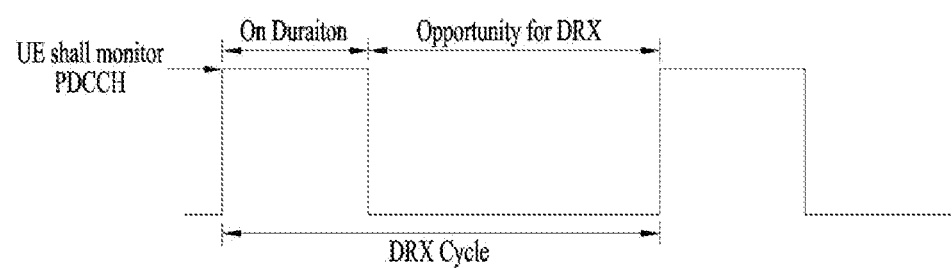
FIG. 14 is a diagram illustrating a Discontinuous Reception (DRX) operation of a UE according to an embodiment of the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 14, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 12 describes a DRX operation of a UE (in the RRC_CONNECTED state). Referring to Table 12, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 12

|  | Type of signals | UE procedure |
| --- | --- | --- |
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state The embodiments described above are those in which elements and features of the present disclosure are combined in a predetermined form. Each component or feature should be considered optional unless explicitly stated otherwise. Each component or feature may be implemented in a form that is not combined with other components or features. It is also possible to configure embodiments of the present disclosure by combining some components and/or features. The order of operations described in embodiments of the present disclosure may be changed. Some features or features of one embodiment may be included in another embodiment, or may be replaced with corresponding features or features of another embodiment. It is obvious that claims that are not explicitly cited in the claims can be combined to form an embodiment or included as a new claim by amendment after filing.

It is apparent to those skilled in the art that the present disclosure may be embodied in other specific forms without departing from the characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

INDUSTRIAL AVAILABILITY

The present disclosure may be used in a terminal, a base station, or other equipment of a wireless mobile communication system.

The invention claimed is:

1. A method of performing a small data transmission (SDT) procedure by a user equipment (UE) in a wireless communication system, the method comprising:
receiving a radio resource control (RRC) release message including SDT configuration information;
converting a current state to an RRC INACTIVE state based on the RRC release message; and
performing the SDT procedure based on the SDT configuration information,
wherein the SDT configuration information includes a configured grant (CG) configuration for the SDT procedure an uplink bandwidth part (BWP) configuration for the SDT procedure, and a downlink BWP for the SDT procedure, wherein the SDT configuration is configured for a specific cell, and wherein the UE stops a TAT (Time Alignment Timer) running for the SDT procedure based on an initiation of the SDT procedure for a cell different from the specific cell.

2. The method of claim 1, wherein the CG configuration includes one or more CG configuration indexes.

3. The method of claim 1, further comprising:
receiving configuration information on a search space related to the SDT procedure;
monitoring the search space for the one or more SDTs;
receiving downlink control information (DCI); and
performing the SDT procedure based on the DCI,
wherein the DCI includes at least one of resource allocation information for transmission of the SDT procedure, and indication information indicating deactivation, release, or suspension of the CG.

4. The method of claim 1, wherein, based on a preconfigured threshold and a quality of a synchronization signal block (SSB) related to the CG configuration, the SDT procedure is performed based on the CG configuration or RACH (Random Access Channel) procedure.

5. The method of claim 4, wherein, based on the quality of the SSB above the preconfigured threshold, the SDT procedure is performed based on the CG configuration.

6. The method of claim 4, wherein, based on the quality of the SSB that is less than the preconfigured threshold, the SDT procedure is performed based on the RACH procedure rather than the CG configuration.

7. The method of claim 1,
wherein, the UE further receives configuration information for a search space related to the SDT procedure, and
wherein the search space for the one or more SDTs is a common search space (CSS) or a UE-specific search space (USS).

8. The method of claim 1, wherein, based on at least one of a quality of a synchronization signal block (SSB) related to the CG configuration, the validity of the CG configuration, a quality of the serving cell, and an amount of uplink data to be transmitted through the SDT procedure, the SDT procedure is performed based on the CG configuration or RACH (Random Access Channel) procedure.

9. A user equipment (UE) for wireless communication, the UE comprising:
a transceiver; and
one or more processors,
wherein the one or more processors are configured to:
receive a radio resource control (RRC) release message including small data transmission (SDT) configuration information;
convert a current state to an RRC INACTIVE state based on the RRC release message; and
performing the SDT procedure based on the SDT configuration information, and
wherein the SDT configuration information includes a configured grant (CG) configuration for the SDT procedure, an uplink bandwidth part (BWP) configuration for the SDT procedure, and a downlink BWP for the SDT procedure,
wherein the SDT configuration is configured for a specific cell, and
wherein the one or more processors are further configured to stop a TAT (Time Alignment Timer) running for the SDT procedure based on an initiation of the SDT procedure for a cell different from the specific cell.

10. A method of receiving a uplink data by a base station (BS) in a wireless communication system, the method comprising:
transmitting, to a user equipment (UE), a radio resource control (RRC) release message including small data transmission (SDT) configuration information; and
receiving the uplink data related to the SDT procedure,
wherein the SDT configuration information includes a configured grant (CG) configuration for the SDT procedure, an uplink bandwidth part (BWP) configuration for the SDT procedure, and a downlink BWP for the SDT procedure,
wherein the SDT configuration is configured for a specific cell, and
wherein, based on the initiation of the SDT procedure for a cell different from the specific cell, a TAT (Time Alignment Timer) running for the SDT procedure is stopped.

11. The method of claim 10, wherein the CG configuration includes one or more CG configuration indexes.

12. The method of claim 10 wherein, based on a preconfigured threshold and a quality of a synchronization signal block (SSB) related to the CG configuration, the SDT procedure is performed based on the CG configuration or RACH (Random Access Channel) procedure.

* * * * *

UNITED STATES PATENT AND TRADEMARK OFFICE
CERTIFICATE OF CORRECTION

PATENT NO. : 11,910,400 B2  
APPLICATION NO. : 17/988689  
DATED : February 20, 2024  
INVENTOR(S) : Youngdae Lee et al.

Page 1 of 1

It is certified that error appears in the above-identified patent and that said Letters Patent is hereby corrected as shown below:

In the Claims

Claim 1, Column 31, Line 2, "a downlink BWP for the SDT procedure" should be "a downlink BWP configuration for the SDT procedure";

Claim 9, Column 32, Line 16, "a downlink BWP for the SDT procedure" should be "a downlink BWP configuration for the SDT procedure"; and Claims 10, Column 32, Line 33, "a downlink BWP for the SDT procedure" should be "a downlink BWP configuration for the SDT procedure".

Signed and Sealed this  
Fifteenth Day of July, 2025

Coke Morgan Stewart  
*Acting Director of the United States Patent and Trademark Office*